APPARATUS TO CONTROL A NUMBER OF GRAPHICAL PLOTTING MACHINES FROM A SINGLE DATA PROCESSING SYSTEM

Filed July 29, 1963 4 Sheets-Sheet 1

INVENTORS
ALAN K. JENNINGS
EUGENE SEID
FRANKLYN L. WILEY
Albert Rosen
Fraser and Bogucki
ATTORNEYS INVENTORS
ALAN K. JENNINGS
EUGENE SEID
FRANKLYN L. WILEY
Albert Rosen
Fraser and Bogucki
ATTORNEYS July 16, 1968 A. K. JENNINGS ET AL 3,393,300

APPARATUS TO CONTROL A NUMBER OF GRAPHICAL PLOTTING MACHINES FROM A SINGLE DATA PROCESSING SYSTEM

Filed July 29, 1963 4 Sheets-Sheet 3

INVENTORS
ALAN K. JENNINGS
EUGENE SEID
FRANKLYN L. WILEY

Albert Rosen
Fraser and Bogucki
ATTORNEYS

APPARATUS TO CONTROL A NUMBER OF GRAPHICAL PLOTTING MACHINES FROM A SINGLE DATA PROCESSING SYSTEM

Filed July 29, 1963

INVENTORS
ALAN K. JENNINGS
EUGENE SEID
FRANKLYN L. WILEY
Albert Rosen
Fraser and Bogucki
ATTORNEYS

3,393,300
APPARATUS TO CONTROL A NUMBER OF GRAPHICAL PLOTTING MACHINES FROM A SINGLE DATA PROCESSING SYSTEM

Alan K. Jennings, Anaheim, Franklyn L. Wiley, Long Beach, and Eugene Seid, Los Angeles, Calif., assignors to California Computer Products, Inc., Anaheim, Calif., a corporation of California Filed July 29, 1963, Ser. No. 298,242
12 Claims. (Cl. 235—151)

This invention relates to data processing systems, and is of particular application to arrangements for distributing data commands from a data processing system to associated output devices.

In order for the capabilities of a modern high speed computer to be fully utilized, associated output devices should accept data at compatible data transfer rates and should also complement or fulfill the potentialities of the computer. For example, when an extended sequence of computations is carried out, the results should be displayed immediately in readily interpreted and easily understandable form. It has heretofore often been necessary, however to present calculations as to a number of different variables by a laborious procedure involving the preparation of successive digital records for each variable, as on punched cards or tabulating sheets. While full data is contained in such successive measurements, meaningful variations in the data are not readily discerned within the mass of digital information.

It is therefore highly desirable to be able to convert a number of successive readings derived during a computing operation into some graphical display which can serve as a permanent record and which can also be readily interpreted. The procedure heretofore commonly used has converted the successive digital representations to analog signals and used the analog signals to control a chart recorder. With this procedure, three different accessories are needed for addition to the computer, these being the original output device, a digital to analog converter, and the graphical recorder. Most graphical recording systems of this kind, moreover, provide only a basic capability for drawing continuous curves, although they may be given a limited character printing capability at considerable increase in cost and complexity. Furthermore, the preparation of data for such a system is unduly burdensome on the programmer or system operator. The program must also be limited to the capabilities of the output device which directly receives the process data, and this data must be transferred, sometimes physically transported, to the associated converter and output recorder, and finally desired notations must be made on the prepared record to indicate coordinates, the variables under consideration, particular events, and the like.

With these considerations in mind, there have been developed improved data processing systems which fully utilize computer capabilities and which directly control ulating the performance of a given piece of apparatus, programs to provide a virtually unlimited variety of continuous and discontinuous records for best visual presentation of the results of calculations. For example, in simulating the performance of a given piece of apparatus, programs may be prepared so that each of the curves representing different variables may be given a different and unique identifying symbol, coordinates may be marked out for reference, and identifying legends and special notations may be included directly on the record. Therefore, once a program is prepared, the results of the programmed calculations are directly evidenced by presentation of the data in a readily interpreted form. All the intermediate processing steps and further items of equipment heretofore used are thereby made unnecessary.

Direct cooperation of a graphical output device and a computer is made possible by new forms of high speed digital incremental recorders which use recording instruments which are movable in three directions relative to a recording media. The increments of movement along the plane of the record are so small that discontinuous (e.g. characters and arbitrary special symbols) data as well as continuous data may be plotted. The primary requirements imposed on such systems are that the program for the computer be prepared such that the successive commands for the plotter represent differential incremental values, each taken relative to the preceding plotting point, and that the rates at which the commands are provided not exceed the operative rates of the plotters themselves.

With such new and improved plotters, the full capabilities of computers and other automatic data processing machines are in some instances fully utilized for the first time. Conventional programming techniques, or standardized program-libraries, may be used, because the programs are repeatable with different variables. Because the incremental movements are uniform, the recorder is highly reliable and extremely accurate, although relatively inexpensive.

An important consideration in the arrangement and use of data processing systems utilizing digital incremental recorders lies in the preservation of proper timing and data transfer relationships between the computer and the associated plotter. For reliability and economy, it is not only convenient but preferable to use essentially the same proven plotter design for all computers, although the plotter design may vary as to increment size and stepping speed. It is desirable, however, to provide as simple control as possible of the X, Y and Z (plotting instrument) axis movements. The simplest form of control is to provide +X, −X, +Y, −Y, +Z and −Z control signals on separate input terminals to the plotter. Clearly, modification of the plotter to cooperate with each different type of computer, so as to return the signals needed by the computer and to transfer computer data to the plotter, would unduly complicate the system.

It is therefore preferred to interconnect the computer and plotter in such a manner and by such means that a cooperative whole is established without modifying either the computer or the plotter, while satisfying the essential requirements of each. It is also highly desirable for the interconnecting means to be capable of operating a number of plotters concurrently under the command of the computer, so that the full speed capability of the computer can be utilized under all types of programs. Such interconnecting means must, however, satisfy a number of specific requirements. The signals which are required to be returned to the computer to enable it to carry out further operations must not only be in proper order but must be provided as soon as possible following the generation of an instruction or command character at the computer. This command must be transferred as an appropriate signal pattern for controlling the plotter. Once the plotter is instructed, a new command cannot be transferred to the plotter until such time as the previous instruction has been carried out, which may require different time intervals for execution of commands on the Z axis as opposed to the X and Y axes. Errors in the form of parity errors or illegal code combinations must also be indicated, and utilized in the data processing system.

It is therefore an object of the present invention to provide an improved system for preparation of graphical data from data provided by a computer.

Yet another object of the present invention is to provide improved means for interconnecting a single computer with each of a number of plotters, with each of the plotters being operated concurrently from the computer, but without internal modification.

Another object of the present invention is to provide an improved graphical plotting system for coaction with a computer, and for providing parity and illegal code checks.

Another object of the present invention is to provide systems for controlling a graphical plotting system from a data processing machine, which systems permit selective rejection of portions of the instructions for the plotter.

A further object of the present invention is to provide improved systems for controlling a number of graphical plotting machines from a single data processing system.

These and other objects of the systems in accordance with the present invention are met by control systems which respond to characters selectively provided from a data processing machine and which cooperate with a processing machine to ensure that commands are executed correctly and that maximum overall speed is attained. A number of individual plotters may be run in parallel from a single high speed data processing system, the output characters from which are encoded to select both the plotter to be used and the individual movement which is to be undertaken. In one example, individual data conversion, error check and response circuits may be utilized with separate gating and interlock circuits for each plotter. The transfer of each data command to an individual plotter proceeds after an interchange of signals indicating that the particular plotter device has executed any previous command and is ready to receive a new instruction. When the new command has been provided, the particular plotter remains disabled against the acceptance of further commands until the time required for completion of the last previous command has transpired. Other plotters may, however, be used during this interval. Another feature of this arrangement is a counter control circuit by which selected parts of the data instructions may be rejected even though signals are properly returned to the data processing system to ensure the continuous flow of data. A further feature is the provision of error checking circuits which identify illogical or illegal codes as well as parity errors which may occur in the commands for the plotters. The error checking circuits may advantageously use the counter for storage of error indications.

Another feature of systems in accordance with the invention is the provision of a multiplexing system having minimized individual control circuits for each plotter. Functions common to all the plotters are combined in a central control means wherever possible.

A better understanding of the invention may be had by reference to the following description, taken in conjunction with the accompanying drawings, in which.

Figure 1:
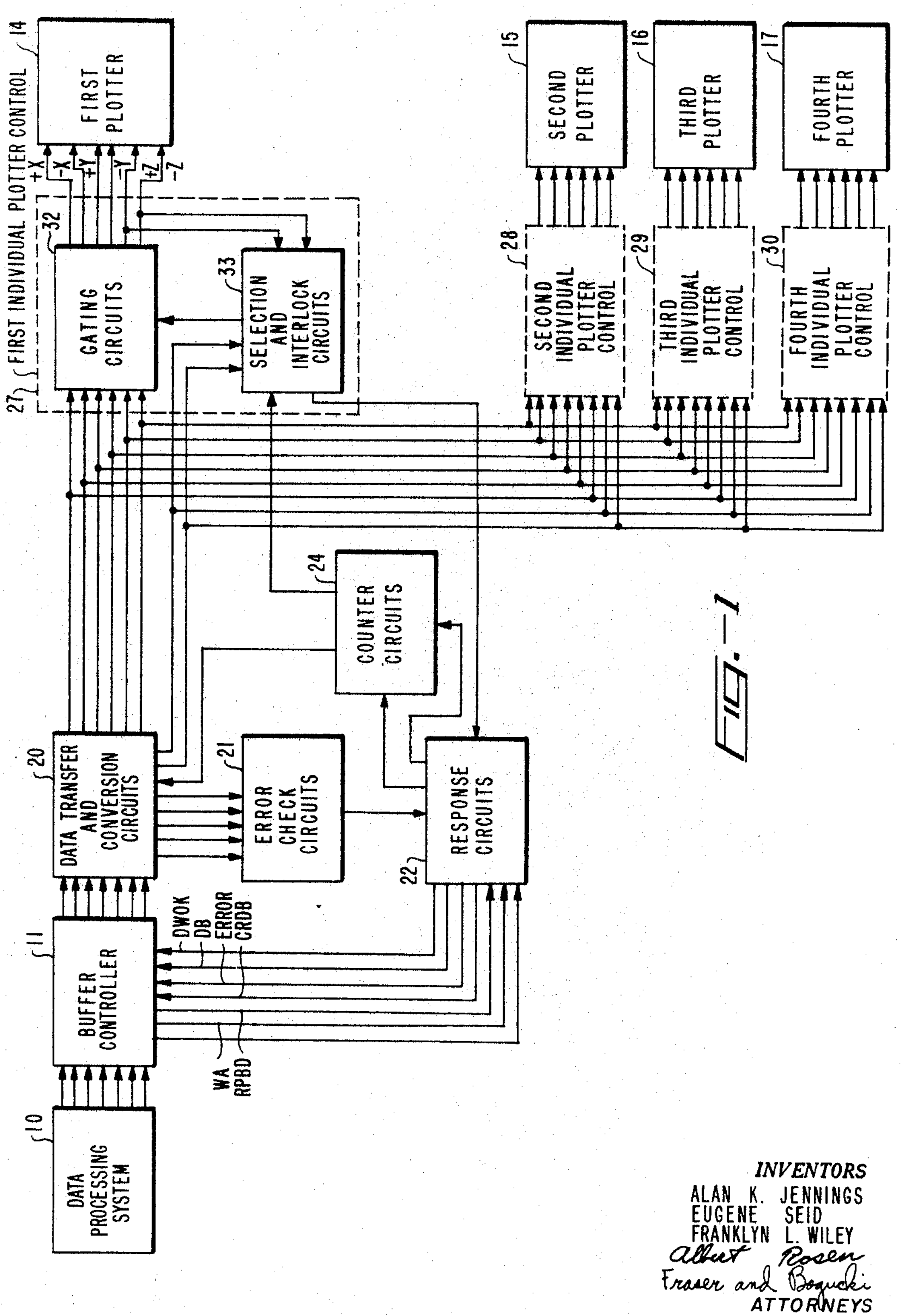
FIGURE 1 is a block diagram of the principal elements of an arrangement in accordance with the invention.

A particularly useful example of systems in accordance with the present invention is employed in conjunction with the Philco model 2000 computer, such as is represented by the data processing system 10 in FIGURE 1. The Philco 2000 is a fixed word length computer providing seven-bit output characters, and having as an additional feature an output device referred to as the Philco "Universal Buffer Controller." The Buffer controller 11 requires a predetermined sequence of transmitted and received signals in order that the associated output device and computer may coordinate properly. In the example of FIGURE 1, as described in detail below, four plotters 14–17 may be used with a common control system and certain individual control elements associated with different plotters. A central control system, including data transfer and conversion circuits 20, error check circuits 21, response circuits 22, and counter circuits 24, is coupled to one Buffer Controller 11 by seven data lines as well as a number of control signal lines. Of the seven data lines, two are used for plotter selection, four are used for plotter command, and one is used for parity checks.

The various circuits within the central command system are used in common fashion with any of the plotters 14–17. Separate individual plotter control circuits 27–30 are, however, also employed, and these also form part of the general command control system. As shown only in conjunction with the first individual plotter control 27, each includes gating circuits 32 and selection and interlock circuits 33.

Output data is provided from the Philco 2000 system in blocks of 1024 characters each. As each character is supplied, it is retained at the computer output terminals until released by a signal returned through the Buffer Controller 11 from the associated output device. As will be understood by those skilled in the art, when it is desired to control a number of output devices the programmer prepares a sequence of output instructions containing the commands for appropriate distribution to the various plotters 14–17. As will further be understood by those familiar with the Philco 2000 system, it includes a "WRITE ALL" option in which, at the selection of the programmer or system operator, it may be desired to plot or otherwise record all characters of a block, or to omit the first eight characters of a block. The Philco 2000 system also operates to undertake a parity subroutine at the termination of provision of a block of data.

Digital incremental plotters of the type which are preferably used in systems in accordance with the invention can currently undertake movements on the X and Y axes simultaneously. For preparation of plots of virtually unlimited length at high speed and with high precision, it has been found advantageous to move the plotting chart on a drum on the X axis, and to move the plotting instrument on a carriage along a Y axis relative to the drum. For convenience of reference, a down movement of the drum will be referred to as the +X direction, and a left movement of the carriage will be referred to as the +Y direction. The recording pen or other recording instrument therefore moves on the Z axis, with the +Z movement being the pen down direction. With a high speed plotter which undertakes X and Y movements at the rate of 300 steps per second, approximately 3.35 ms. are required for the execution of these plotting commands. Pen movements require somewhat less than 1/10 of a second, so 100 ms. are required between successive commands.

In the programming of data with this system, the $2^0$ and $2^1$ lines are used for selection of individual plotters, when four different plotters 14–17 are to be operated from a single Buffer Controller 11. The codes 00, 01, 10 and 11 are therefore available for selection of the individual plotters 14–17. Note that many more plotters may be controlled from a single system without enlarging this code if a signal distributing system is coupled between the Buffer Controller 11 and the individual control systems 27–30. In this event, four commands may be sent in any order to a first group of plotters, after which the distributing system may switch to the second group of plotters and another group of four commands may be sent, etc. A separate instruction code may also be employed for controlling a distributing system, to enable operation of the plotters within any group in any desired order through a number of different sequences. Enlargement of the plotter selection code in binary fashion would of course afford a corresponding increase in the number of plotters which could be used with a single Buffer Controller.

The next four output lines are used for transfer of data commands, in accordance with the following code:

TABLE A

| $2^5$ | $2^4$ | $2^3$ | $2^2$ | Plotter Movement |
|---|---|---|---|---|
| 0 | 0 | 0 | 1 | +Y |
| 0 | 0 | 1 | 0 | −Y |
| 0 | 1 | 0 | 0 | +X |
| 1 | 0 | 0 | 0 | −X |
| 0 | 1 | 0 | 1 | +Y, +X |
| 0 | 1 | 1 | 0 | −Y, +X |
| 1 | 0 | 0 | 1 | +Y, −X |
| 1 | 0 | 1 | 0 | −Y, −X |
| 0 | 0 | 0 | 0 | Pen Up. |
| 1 | 1 | 1 | 1 | Pen Down. |

All other codes than these are illegal codes and produce no movement of the plotter.

In the operation of the system as generally shown in FIGURE 1, preparatory signals are exchanged between the Buffer Controller 11 and the control system for each data character. The data character, when converted to an appropriate command, is entered into the particular plotter for which it is intended by virtue of the operation of the selection circuits. That particular plotter remains disabled for the reception of a new command until an interval has passed which is sufficient for the previous command to be executed. During this interval, however, any other plotter which is free to receive a command may be actuated.

DETAILED DESCRIPTION OF OPERATION

Figures 2, 4:
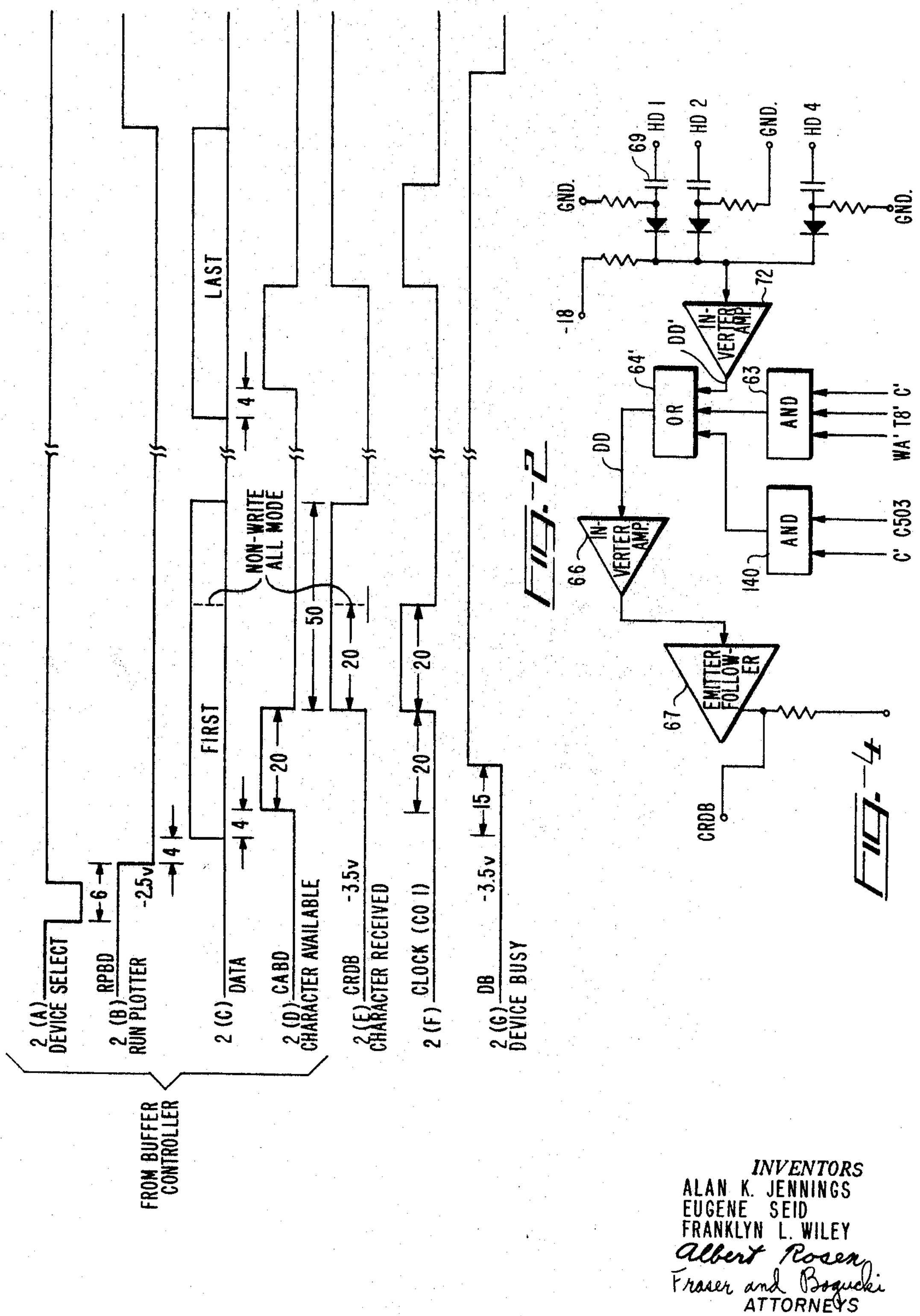
FIGURE 2 is a timing diagram, showing the time relationships of various signals arising in the operation of a particular system example.
FIGURE 4 is a block diagram of a system corresponding to that of FIGURE 3, but incorporating further and different features.
Figure 3A:
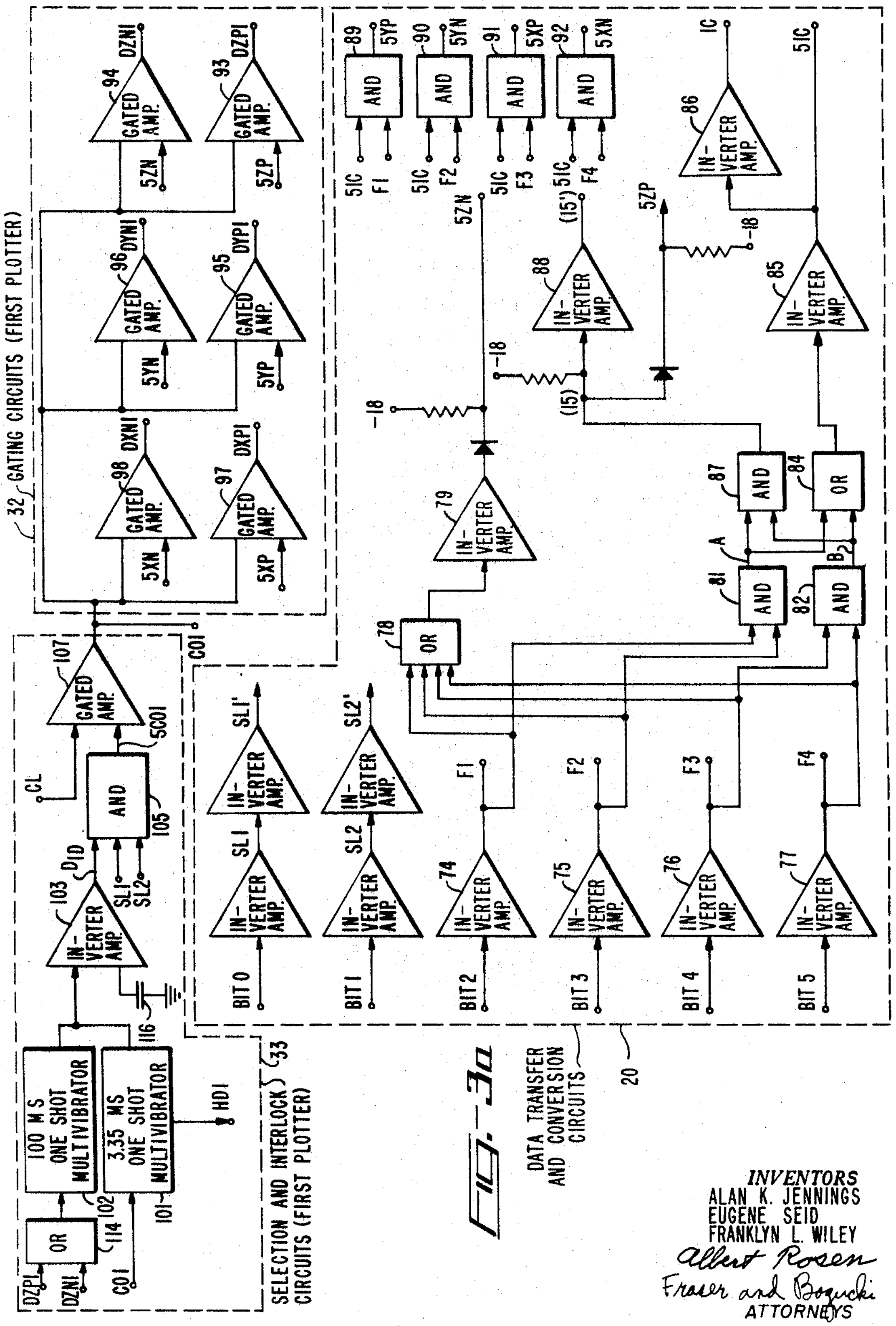
FIGURE 3 is a detailed block and partial schematic diagram, comprising Sheets 3A and 3B, of an individual control system in accordance with the invention.
Figure 3B:
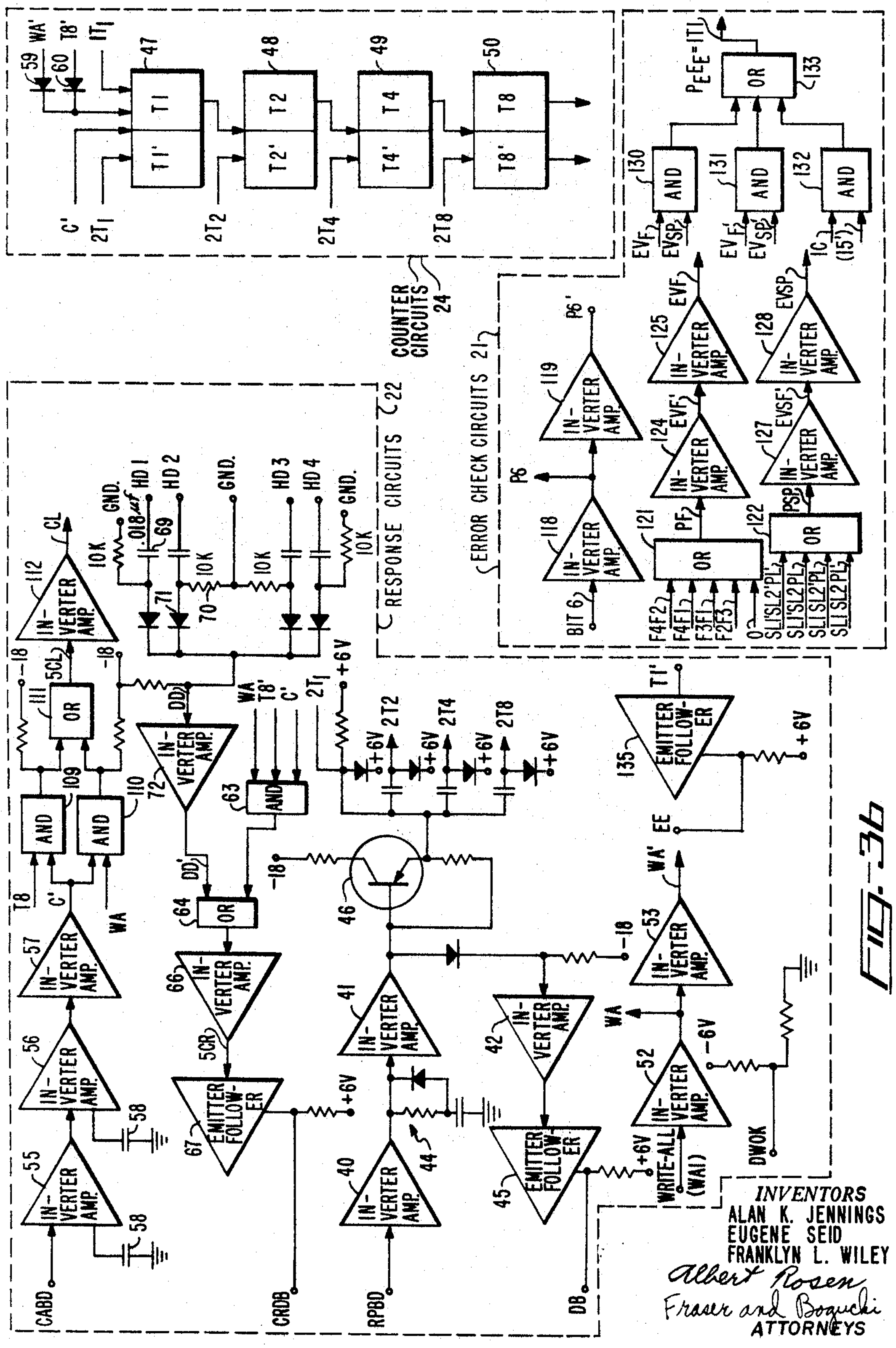

The operation of a detailed example of a system in accordance with the invention may be best understood by reference to the detailed diagram of FIGURE 3, taken together with the timing diagram of FIGURE 2. In FIGURE 3, the principal functional units are grouped and identified in accordance with the blocks in the block diagram of FIGURE 1. Input data is provided on the seven input lines designated bit 0, bit 1, . . . bit 6. The data representing the plotter commands is supplied on the four lines designated bit 2 to bit 5 which are coupled into the data transfer and conversion circuits 20. The plotter selection data is supplied on the lines designated bit 0 and bit 1 to the selection and interlock circuits 33. The parity bits for each data character provided from the Buffer Controller are supplied on the line designated bit 6 to error check circuits 21.

As noted in FIGURE 2, the various components are all present at a central position, except for the selection and interlock circuits 33 and the gating circuits 32 which are used for each individual plotter. Thus there is a minimum of duplication of equipment, and maximum usage of the data transfer and conversion circuits 20, the counter circuits 24, the error check circuits 21, and the response circuits 22.

As partly shown in FIGURE 2, the signals provided from the Buffer Controller 11 are the "device select" signal, the "run plotter" (RPBD) signal, the "data" signal, the "character available" (CABD) signal, and the "write all" (WA) signal (not shown in FIGURE 2). The command control system returns a "device busy" (DB) signal, an "edit error" (EE) signal (not shown) if errors exist, and a "character received" (CRDB) signal.

A more detailed explanation of the generation of the successive pulses provided from the Buffer Controller and the return pulses will be supplied as the description proceeds.

The arrangement shown in FIGURES 1 and 3 is a multiplexing system, in which a number of individual plotters may be simultaneously controlled from a single data processing system 10. If the Write All instruction has not been supplied from the Buffer Controller 11, the first eight characters of a 1,024 character group are not used as commands, but the system plots in accordance with all succeeding command characters. Error checks are continuously made during transfer and a final error edit check is made by the Buffer Controller at the completion of the group.

*Reception of control signals and provision of response signals.*—The principal data reception, gating and response functions are provided for all plotters within a single set of response circuits 22. As shown in FIGURE 2, waveform 2A, the initiation of communication between the Buffer Controller and the plotter systems is marked by the Device Select signal. This signal is principally used in control of other output devices, and is not needed by the plotter system, so that the line is not monitored and the system merely waits for the succeeding signal.

Approximately six microseconds after the device select signal, the RPBD signal is initiated at the Buffer Controller (waveform 2B), shifting the voltage level on the input terminal from ground to −2.5 volts (in this example). The RPBD signal in turn is used to generate the DB signal (waveform 2G after a selected delay, and to reset the counter circuits 24. For the generation of the DB signal, a series of three inverter amplifiers 40, 41, 42 is employed. A passive circuit 44 providing a 15 microsecond delay in the change of state of the signal is coupled between the output terminal of the first inverter amplifier 40 and the input terminal of the second inverter amplifier 41 in this series.

In the following description, a convention is observed in which the most negative level of a signal is called the "true" level and the most positive signal level is called the "false" level. Therefore, the "true" RPBD state is indicated as "false" at the output of the first inverter amplifier 40, "true" at the output of the second inverter amplifier 41, and "false" again at the output terminal of the third inverter amplifier 42. Therefore, fifteen microseconds after RPBD goes "true," by swinging to ground from −2.5 volts, the DB signal level indicates "false" by shifting from the −3.5 volt quiescent level to ground, as shown at waveform 2G of FIGURE 2. The DB output signal is provided by the output of a first emitter follower 45 which is coupled to the third inverter amplifier 42.

During this preparatory interval, the counter circuits 24 which are used in the Write All option and for error check storage must be reset. Resetting is accomplished by a signal derived from a second emitter follower 46 that is coupled to the output terminal of the second inverter amplifier 41 and that goes "true" fifteen microseconds after the initiation of the RPBD signal. The counter circuits 24 consist of four binary stages 47, 48, 49, 50 having conventional inter-couplings between stages, and including DC inputs for each half of each stage as well as the trigger intercoupling inputs. The output of the second emitter follower 46 is coupled to the zero-valued input terminal (designated 2T1, 2T2, 2T4, 2T8) of each of the four counter stages 47–50 through individual coupling capacitors. When the second emitter follower 46 changes to the "true" state, a negative pulse is passed through the coupling capacitors to force the various counter stages 47–50 into their "false" states.

It should be borne in mind that the specific circuit examples and values which are given are merely to illustrate one particularly advantageous way of constructing a system in accordance with the invention. Detailed examples of the operation of the specific parts of the circuitry are omitted wherever feasible, inasmuch as the specific circuits are not essential to the systems in accordance with the inventions, and inasmuch as their operation will be well understood by those skilled in the art.

Approximately four microseconds after the RPBD signal is initiated, the data signals appear (waveform 2C) on the seven input lines from the Buffer Controller 11 (FIGURE 1). The first alternative mode of operation involves bypassing the first eight characters of the 1024 character group if the Write All switch is off at the Buffer Controller.

*Write All option.*—With the Write All switch off, the WAI input signal is "false," at a minus 3.5 volt level, as opposed to a ground level if the switch is on. The WAI signal is coupled to a series pair of inverter amplifiers 52, 53, the first of which provides the WA signal, here "false," and the second of which provides the WA′ signal, here "true." The WA′ signal and a C′ signal that is generated in response to the CABD signal generated at the Buffer Controller are utilized to control the counting of the first eight characters. Note that in waveform 2D of FIGURE 2, the CABD signal is provided approximately four microseconds after the initiation of the data signal. The CABD signal is applied to a series of three inverter amplifiers 55, 56, 57, the first two of which have input capacitors 58 which introduce a total delay of about 20 microseconds. The output signal from the third inverter amplifier 57 is the C′ signal and is applied 20 microseconds after the start of CABD to the trigger input of the T1 stage 47 of the counter circuits 24 at the same time as WA′ and T8′ signals are applied to the one-valued DC input of the stage 47. The WA′ and T8′ signals must be in coincidence at a pair of individual diodes 59, 60 before the C′ signal will invert the state of the first counter stage 47. The succeeding stages 48–50 operate in binary sequence by passage of trigger signals along the inter-couplings between the one-valued output terminals of a stage and the trigger input of the succeeding stage. A standard flip-flop configuration may be used in which direct couplings from a constant voltage source (not shown) to the appropriate DC inputs condition the particular stages for triggering pulses.

The first three binary stages count the successive C′ pulses, one for each CABD signal, until seven pulses have been received, at which time each of the T1, T2, and T4 stages is in the "one" state. The next C′ pulse then sets the T8 stages 50 into the one-valued state, with T1, T2 and T4 all becoming false, or zero-valued. At this point in time, the first eight characters in a character group have been bypassed and no commands have been transferred to the plotters, as is desired for the non-Write All mode.

During this same interval, CRDB signals (waveform 2E) are returned to the Buffer Controller, each CRDB signal beginning at the termination of the corresponding CABD signal and concurrently with the C′ signal. For this purpose, the WA′, T8′, and C′ signals are concurrently applied to a separate AND gate 63 which is coupled through an OR circuit 64 to the input of an inverter amplifier 66 having a succeeding emitter follower 67 whose output terminal is coupled to the CRDB line. When the WA′, T8′, C′ terms become true, the output term, 5CR, at the inverter amplifier 66, becomes false, and the CRDB signal level, which is at minus 3.5 volts in the quiescent state, goes positive, or "false." The CRDB signal causes the Buffer Controller to return CABD to the minus 3.5 volt level, and this change of state, after the introduction of another approximately 20 microseconds delay because of the capacitors 58 coupled to the first two inverter amplifiers 55, 56, results in termination of the C′ and CRDB signals approximately 20 microseconds later. The data signals are terminated with the termination of CRDB, so that the cycle may be repeated with a new character sequence substantially immediately thereafter.

The time needed for this full cycle is substantially shorter than the cycle requires when the plotter is actually receiving commands. After the first eight characters in the non-Write All mode, and for each character in the Write All mode, the CRDB signal is retained for approximately 50 microseconds. The clock signal generated in the selection and interlock circuits 33 for any one of the plotters are employed to initiate CRDB in a different manner. In each selection and interlock circuit 33, as is described in detail below, a monostable device is actuated by the clock signal to provide an output signal designated HD1, HD2, HD3 or HD4 respectively. The change of state of any of these signals is employed in the response circuits 22 to control a fast discharge, slow recharge circuit which independently controls the duration of CRDB. The discharge circuits for HD1 to HD4 comprise capacitors 69 and grounded resistors 70 connected together to a common line (DD) through isolating diodes 71. The DD signal is applied through an inverter amplifier 72 to generate a DD′ term for the OR circuit 64.

When data is not transferred to a plotter, therefore, CRDB and the data signals are terminated much more quickly than when data is transferred. If the system is in the Write All mode, of course, the extended duration CRDB signals are used throughout.

*Entry of data.*—For each character in the Write All mode, or after the first eight data characters have been bypassed in the non-Write All mode, the command control system functions to transfer data to actuate a selected individual plotter. The input lines to bits 0 and 1 in the selection and interlock circuits 33, bits 2 to 5 in the data transfer and conversion circuits 20, and bit 6 in the error check circuits 21 are all at their quiescent levels of minus 3.5 volts. The arrangement and operation of the selection and interlock circuits 33 and of the error check circuits 21 are described below and the present description is concerned only with the data signals provided on the four lines designated bits 2 to 5. It is assumed, however, that the appropriate code combination (designated as signals SL1 and SL2) is provided on bit lines 0 and 1 for the particular plotter which is to receive the data.

If one of the binary digits is one-valued or "true," the corresponding line is pulsed to ground level four microseconds prior to the provision of the CABD signal (waveform 2C). The outputs of inverter amplifiers 74–77 which receive the bit 2 to bit 5 signals are coupled together through an OR circuit 78 to another inverter amplifier 79 which provides an output signal designated 5ZN. The individual outputs from the separate inverter amplifiers 74–77, designated F1, F2, F3 and F4 respectively, define the individual bits in the plotting command, in accordance with Table A above. The "pen down" command is an all 1's combination of bits 2 to 5, and if this combination is present the OR circuits 78 is not activated and the inverter amplifier 79 output (5ZN) is present.

The remaining commands for the plotter are generated through various gating circuits, which concurrently generate the signals needed for the remaining commands, as appropriate for the particular input signal combination. A pair of AND gates 81, 82 separately receive F1 and F2, and F3 and F4, to generate signals designated A and B, respectively. The A and B signals are coupled together through an OR circuit 84 to successive inverter amplifiers 85 and 86, to generate 5IC and IC signals for a subsequent gating matrix. Additionally, the A and B signals are combined in an AND gate 87, the output from which, after passage through an inverter amplifier 88, is termed the 15′ signal. The non-inverted output signal from the AND gate 87 is present only when the input data is all 0's, and is used as the 5ZP signal, establishing the "pen up" command for the plotter. In the final grouping of four AND gates 89–92, the F1, F2, F3 and F4 signals are selectively combined as shown with the 5IC signals to generate the 5YP, 5YN, 5XP, and 5XN signals respectively. These signals, and the 5ZN and 5ZP signals, are the plotter commands. Note that while X and Y commands may be concurrent, the code system precludes use of any other command with a Z command.

The Z, Y and X commands are thereafter coupled to individual output terminals of six gated amplifiers 93–98 forming the gating circuits 32 which are coupled to the input capacitors of the plotter (not shown). The remaining inputs of each of these gated amplifiers 93–98 are coupled to receive clock signals from the selection and interlock circuits 33, as described immediately below.

*Selection and interlock circuits.*—In the following description, the generalized term N corresponds to the particular plotter with which individual selection and interlock circuits 33 are associated. Thus, the DND line is designated D1D for the first plotter 14, which is the only plotter for which selection and interlock circuits 33 are shown in FIGURE 3. The circuits 33 select that plotter which is to be the recipient of a particular command, and also preserve proper timing relationships. Note that the different cycling times of a plotter, which are dependent on whether a pen up or down movement is to be executed, materially complicate the problem of operating at maximum speed for all commands.

The selection and interlock circuits 33 include a pair of one-shot multivibrators 101, 102, one of which (101) provides a 3.35 millisecond delay, and the second of which (102) provides a 100 millisecond delay. The output signals from both one-shot multivibrators 101, 102 are coupled together at an inverter amplifier 103, the output signal from which here represents the D1D signal. When either one of the one-shot multivibrators is in its active state, the D1D signal is "false," deactivating an associated AND gate 105 which is used for purposes of plotter selection.

The interlock function consists of blocking the reception of a new command for a particular plotter until an appropriate time has elapsed subsequent to the start of execution of the last previous command. This time is, at minimum, 3.35 milliseconds. Normally, the one-shot multivibrators 101 and 102 are in their inactive states, so that application of the data signals results in generation of the clock signal. As seen in waveforms 2C and 2D, the data signals are provided first, and followed by the CABD signal. In the response circuits 22, a CL signal is generated in response to CABD, if the plotter command is to be used. In the selection and interlock circuits 33, activation of the AND gate 105 in response to the proper selection code results in generation of a 5C01 signal (for the first plotter). The clock for the first plotter (C01) is thereby provided by a gated amplifier 107.

Selection of a particular plotter requires that the code combination (bits 0 and 1) applied as SL1 and SL2 (or SL1′ and SL2′) to the AND gate 105 be proper, i.e., 00 for the first plotter. Generation of the CL term results from application of the C′ term to both of a pair of AND gates 109, 110, together with either the T8 or the WA signal. The AND gates 109, 110 are coupled together through an OR circuit 111 to provide a 5CL signal which, after passage through an inverter amplifier 112, provides the CL signal. Thus the CL term is not changed unless T8 has been reached or the system is in the Write All mode. It will be recognized that a number of coincidence gate arrangements can be used for this function. It is preferred to use a convention in which CL remains "true" until changed by CABD, and in which 5C01 may be transferred through the gated amplifier 107 when CL is false.

For interlock purposes, the 3.35 millisecond one-shot multivibrator 101 is actuated by each clock pulse, such as C01 in this instance. If, however, the particular command for the plotter constitutes a command for the relatively slower acting pen mechanism, either the DZP1 signal or the DZN1 signal will pass through an OR circuit 114 to activate the 100 millisecond one-shot multivibrator 102. Thus the D1D signal goes false for either a 3.35 or 100 millisecond interval, sufficient to span the particular plotter movement which is undertaken.

*Gating of output signals.*—When the clock signal is generated it is provided only to the gating circuits for the same plotter (here the circuits 32). In practice, it is found convenient to use like transistor amplifiers 93–98, and to achieve the gating by applying one signal to the base, and the other to the emitter circuit of the transistor. Thus, the CL signal is applied to the emitter circuit of the gated amplifier 107, and the 5C01 signal is applied to the emitter circuit of the same amplifier 107 in the gating circuits 32. A "true" signal, representing an X, Y or Z command, at the base circuit of any of the gated amplifiers 93–98, results in the generation of a positive-going pulse at the output to discharge the input capacitor for the appropriate input terminal in the plotter (not shown in FIGURE 3), thus initiating the desired movement.

The interlock functions also employ the 5IC signal and the signals from the one-shot multivibrators 101, 102. As previously discussed, the C01 signal triggers the 3.35 millisecond one-shot multivibrator 101, to inhibit output signals for as long as this one-shot remains active. An input capacitor 116 at the inverter amplifier 103 introduces an approximately 10 microsecond delay in this action.

It should be noted that the 3.35 millisecond one-shot multivibrator 101 is activated on the reception of each character command. A separate output terminal on this one-shot multivibrator 101, designated HDN in the general case and HD1 in this particular example, is returned to the response circuits 22. Because HD1 to HD4 are derived from the clock pulses, and because new clock pulses cannot be generated until both multivibrators 101 and 102 associated with a given plotter have become inactive, a new command for a given plotter will not be accepted until that plotter is again ready. In effect, CRDB is not returned in response to CABD until released by the selection and interlock circuits 22.

*Parity and error check circuits.*—The error check is completed after the last of the 1,024 characters of a block has been accepted. At this time, the RPBD signal returns to ground, as shown by waveform 2B of FIGURE 2. After a 15 microsecond delay introduced by the passive circuit 44 coupled to the inverter amplifier 40 which received the RPBD signal, the DB signal is returned to the minus 3.5 volt quiescent level. During this interval of 15 microseconds, the Buffer Controller 11 (FIGURE 1) samples for illegal code and parity errors.

The parity and illegal code checks are combined to minimize the amount of checking equipment utilized, and to provide a single error indication to the Buffer Controller. Further, the error check circuits 21 are effectively combined with the counter circuits 24 so as to utilize a part of the counter for storage of the error indication. Error checks are made on the basis of the SL1, SL2, SL1′, and SL2′ signals, along with the F1–F4 signals, the 0 signal, and the bit 6 data signal. The bit 6 input terminal is coupled to a series-connected pair of inverter amplifiers 118, 119, which provide P6 and P6′ signals respectively. Of the 16 possible binary combinations having decimal values from 0 to 15 for the F1 to F4 signals, only the combinations of Table A are valid. The values 3, 7, 11, 12, 13 and 14 represent illegal codes. The 0, 3, 5, 6, 9, 10, 12 and 15 decimal values have an even mod. 2 sum and therefore represent even parity. These relationships may best be understood as illustrated in the following table:

TABLE B

| Decimal Value | $2^5$ F4 | $2^4$ F3 | $2^3$ F2 | $2^2$ F1 | Command | Parity |
|---|---|---|---|---|---|---|
| 1 | 0 | 0 | 0 | 1 | +Y | |
| 2 | 0 | 0 | 1 | 0 | −Y | |
| 3 | 0 | 0 | 1 | 1 | Illegal Code | Even Parity. |
| 4 | 0 | 1 | 0 | 0 | +X | |
| 5 | 0 | 1 | 0 | 1 | +Y, +X | Do. |
| 6 | 0 | 1 | 1 | 0 | −Y, +X | Do. |
| 7 | 0 | 1 | 1 | 1 | Illegal Code | |
| 8 | 1 | 0 | 0 | 0 | −X | |
| 9 | 1 | 0 | 0 | 1 | +Y, −X | Do. |
| 10 | 1 | 0 | 1 | 0 | −Y, −X | Do. |
| 11 | 1 | 0 | 1 | 1 | Illegal Code | |
| 12 | 1 | 1 | 0 | 0 | do | Do. |
| 13 | 1 | 1 | 0 | 1 | do | |
| 14 | 1 | 1 | 1 | 0 | do | |
| 15 | 1 | 1 | 1 | 1 | Pen Down | Do. |
| 0 | 0 | 0 | 0 | 0 | Pen Up | Do. |

It will be observed that the decimal values of 3 and 12 represent both even parity bits and illegal codes. By combining these two and by using bit 6 as a check bit, the error check circuits 21 include means for determining whether the mod. 2 sum of F1, F2, F3 and F4 is odd or even (called PF), and whether the mod. 2 sum of SL1, SL2 and P6 is odd or even (called PSP), then determining whether the combined term $PF \cdot PSP$ is odd or even. A PF OR circuit and a PSP OR circuit are each activated in accordance with the following terms:

$$PF = F4F2 + F4F1 + F3F1 + F3F2 + 0$$
$$PSP = SL1'\ SL2'\ P6' + SL1'\ SL2\ P6 + SL1\ SL2'\ P6 + SL1\ SL2\ P6'$$

An error is indicated by generating EVF' and EVF terms from the PF signal through a series pair of inverter amplifiers 124, 125, and by generating EVSF' and EVSP signals from the PSP signal through a like pair of inverter amplifiers 127, 128. The parity error and edit error term, designated 1T1, is thereafter formed in a group of three AND gates 130, 131, 132 coupled to an OR circuit 133 which controls the 1T1 input of the counter 24, in accordance with the following terms:

$$1T1 = EVF\ EVSP + EVF'\ EVSP' + IC(\mathbf{15'})$$

The (15') term should not be true concurrently with the IC term and the third AND gate 132 is therefore used in a direct check on this illegal code.

Although the Buffer Controller makes its error check following the last character of the character group, a parity or illegal code error is identified and stored immediately upon occurrence. Note that the T1 stage 47 of the counter circuits 24 is in the T1 false state (T1' is true) at the start of transfer of commands to the plotters, whether or not the Write All mode is used. Thus, the combined error term, 1T1, may be used to set the T1 stage 47 whenever an error is found. This state is held until the error check interval. When the T1 term is true, the T1' term is false, and holds the output signal from an emitter follower 135 at approximately ground. The Buffer Controller tests this terminal for the error (EE) signal.

*Alternative system.*—It has been found to be very useful, in operating certain types of data processing systems including the Philco 2000 system, to use what may be termed a "filler" code. Thus, where it is inconvenient to fill all 1024 characters spaced in a group with characters to be plotted, or where blanks may desirably be interspersed within a group, the filler characters are usefully employed. A modification of the system of FIGURE 3 for this purpose is shown in FIGURE 4. The modified system avoids use of an illegal code but does omit one of the plotters, specifically the third. Thus gating circuits 32 for the third plotter are not needed, and only the AND gate 105 for identifying the third plotter selection code is used in the selection and interlock circuits 33. The third plotter selection code 10, for bits 0 and 1, is used as the critical and unique part of the filler code for the system.

In the response circuits 22, the HD3 input terminal is omitted, as shown in FIGURE 4, but an additional input signal is provided to the inverter amplifier 66 coupled to the CRDB lines. This signal is the output from an AND gate 140 which receives the C' and C503 signals, and which is coupled through an OR circuit 64' to the inverter amplifier 66. This input results in the same timing sequence as is followed during the first eight characters of the non-Write All mode. Generation of the C' and 5C03 signals concurrently indicates that the filler code character and CABD have been received, and thus CABD, CRDB and the data signals are terminated quickly, so that another character may be received.

*Summary.*—Systems in accordance with the invention combine the preponderance of multiplexing and control circuitry at a single central control system and employ only gating selection and interlock circuits for each individual plotter. A block of data may be distributed as desired to the different plotters, with the coding and transfers appropriately checked for errors once for each entire block. Filler codes may be utilized with only minor modification of the system. The data constituting the plotter command is converted and applied to the gating circuits of each of the individual plotter systems, but only the one particular plotter which is selected for that particular command receives the code instruction.

The central control circuitry also operates in response to each character and its attendant control pulses, to provide proper responses, whether or not a particular character is used. Further, a selected number of characters of a code group may be bypassed at the start of a character group, following which data may be plotted until the code group terminates.

It will be appreciated that the system can operate without modification in response to unlimited command sequences, as well as fixed length sequences, simply by plotting all commands which are provided. Further, other combinations of response and control signals may be utilized, for cooperation with other data processing systems than the specific example given. It will also be understood by those skilled in the art that appropriate adjustment in the time relationships and in the number of associated plotters or other output devices which are controlled by the circuits may be made by known techniques. For example, if higher or lower speed digital incremental plotters are utilized, the time delay introduced by the one-shot multivibrators may be varied accordingly. Similarly, the number of plotters operating with the system may be decreased without modification of the system, and increased by factors of two for each increase of a single channel in the command inputs to the selection and interlock circuits.

While there have been described above and illustrated in the drawings various forms of command control systems for the control of output devices in close relation to the operation of digital data processing systems, it will be appreciated that the invention is not limited thereto. Accordingly, the invention should be understood to include all modifications, variations, and alternative forms falling within the scope of the appended claims.

What is claimed is:

1. A graphical plotting system comprising a data processing system, a plurality of digital incremental plotters, buffer control means coupled to the data processing system, the buffer control means and the data processing system providing characters in fixed length character groups, and providing selected preparatory signals with each of the characters and requiring selected response signals, response signal means coupled to the buffer control means and responsive thereto, data conversion means coupled to the buffer control means and converting characters received therefrom into commands suitable for actuating a plotter, there being only a single response signal means and a single data conversion means for all plotters, a plurality of gating means, each associated with a different one of the plotters, and each receiving commands from the conversion means, and a plurality of interlock control means, each associated with a different one of the plotters and coupled to the related one of the gating means for controlling said gating means.

2. A graphical plotting system comprising a data processing system, a plurality of digital incremental plotters, each having different cycling times for different commands provided thereto, data buffer means coupled to the data processing system, the data buffer means providing characters in fixed length character groups, each of the characters having associated with it selected preparatory signals and the data buffer means requiring selected response signals for each character, a single response signal means coupled to the data buffer means, a single data conversion means coupled to the data buffer means and converting data received therefrom into commands suitable for actuating a plotter, a plurality of gating means, each associated with and coupled to a different one of the plotters, and each receiving the commands from the data conversion means, and a plurality of interlock control means, each associated with a different one of the plotters and coupled to a different individual one of the gating means for controlling said gating means, and each responsive to the nature of the commands for disabling the gating means for a selected interval thereafter, the interlock control means also being coupled to control the response means.

3. A graphical plotting system comprising a data processing system providing data characters at a relatively high rate and requiring response signals for each character, a plurality of digital incremental plotters, a plurality of gating means each associated with and coupled to a different one of the plotters and each including means for transferring commands to the associated plotter, a plurality of timing control means, each associated with a different one of the plotters and coupled to the associated gating means, and each including means for selectively actuating the associated gating means in response to input commands and thereafter disabling the gating means for a selected interval, a single data conversion means receiving the data characters from the data processing system, and providing data commands to each of the gating means, and a single response means, responsive to the data characters from the data processing system and to the disabling action provided by the timing control circuits, for providing response signals to the data processing system.

4. A graphical plotting system comprising a data processing system providing data characters at a relatively high rate and requiring response signals after each character, a plurality of digital incremental plotters, each having two different cycling times dependent upon the commands thereto, a plurality of gating means, each associated with a different one of the plotters and each including means for transferring data in the form of commands to the associated plotter, a plurality of timing control means, each associated with a different one of the plotters and each including means for selectively actuating the associated gating means in response to input commands and thereafter disabling the gating means for a selected interval, dependent upon the particular command, a single data conversion means receiving the data characters from the data processing system, and providing data commands to each of the gating means, and a single signal response means, responsive to each of the data characters from the data processing system and to the disabling signals provided from each of the interlock circuits, for providing response signals to the data processing system.

5. A system for providing a plurality of graphical plots of information provided as data characters from a data processing system and comprising a plurality of digital incremental plotters, a single control means coupled to receive characters from the data processing system, the single control means including means to provide data commands suitable for the plotters, a plurality of gating means coupled to the control means and each providing data command transfer couplings to a different individual one of the plotters, a plurality of interlock control means, each activating an individual gating means in response to the data commands, and a single response circuit means coupled to each of the interlock control means and providing response signals to the data processing system in response to the reception of data.

6. The invention as set forth in claim 5 above, wherein the data characters are transferred in selected fixed length character groups, and wherein the system includes in addition character counter means, and gating means responsive to the characters and coupled to the counter means for blocking transfer of a selected number of initial characters of the character group.

7. A system for providing a plurality of graphical plots of data characters provided from a data processing system and comprising a plurality of digital incremental plotters, a single control means coupled to receive characters from the data processing system, the single control means including means to provide data commands suitable for the plotters, a plurality of gating means coupled to the control means and providing data transfer couplings to different individual ones of the plotters, a plurality of interlock control means, each operative for alternative intervals selected relative to the cycling times of one different plotter and responsive to individual data commands for said plotter to operate for one of the alternative intervals, and a single response circuit means coupled to each of the interlock control means and responsive to the reception of data for providing response signals to the data processing system.

8. The invention as set forth in claim 7 above, wherein the data characters are transferred in selected fixed length character groups, and wherein the system includes in addition character counter means and gating means responsive to the characters and coupled to the counter means for disabling transfer of a selected number of initial characters of the character group, and wherein the system also includes logical circuit means coupled to the conversion means and the counter means for indicating the existence of an error in an individual character by modification of the count presented by the counter means.

9. A system for distributing data from a high speed data processor to command individual ones of a group of lower-speed output devices which are intermittently operated, the data processor providing data signals and requiring response signals, and the system comprising: means responsive to the data from the high speed data processor for distributing the data to individual output devices; means responsive to the content of the data for indicating the interval of unavailability of each particular output device subsequent to its reception of data; means responsive to the data for providing predetermined signals indicating that particular data is not to be used for commands; and means responsive to the distribution of the data and to the predetermined signals for controlling the time of the response signals relative to the data.

10. A system for distributing data from a high speed data processor, as a sequence of individual characters, to command individual ones of a group of lower speed output devices, comprising: means responsive to the data characters for distributing individual characters to selected output devices; means responsive to the nature of the characters for providing a timing signal indicating the interval of unavaliability of the particular output device receiving the character; means responsive to the nature of the character for indicating that that particular character is not to be used as a command for the output device; and means responsive to the distribution of the data and to the indication of non-use for a command for providing response signals at different times relative to the data.

11. A system for distributing data in the form of individual characters from a high speed data processor to command individual ones of a group of lower speed output devices, comprising:

means responsive to the characters for distributing individual characters to corresponding selected output devices, means responsive to the nature of the characters themselves and coupled to the first named means for providing clock pulses to control the transfer of data to the output devices, response signal generating means comprising a first pulse generator means actuable in response to applied input signals to return response signals to the data processor, second pulse generator means responsive to the clock pulses and coupled to (1) actuate the first pulse generating means and (2) deactivate the clock means after given intervals of operation, and third pulse generating means having a different interval of operation than the second pulse generating means for actuating the first pulse generating means.

12. A data distribution system for actuating a number of output devices from a data processor providing data characters, including the combination of:

means, including counter means, responsive to characters from the data processor for returning response signals to the data processor without actuating the output devices, data conversion means coupled in a data transfer path between the data processor and the output devices, means responsive to the nature of the characters for operating the data conversion means to gate characters as commands to selected ones of the output devices, parity checking means recoupled to the data conversion means and responsive to the characters providing a first error signal, illegal code checking means coupled to the data conversion means and responsive to the characters for providing a second error signal, and means responsive to the first and second error signals and applying a combined error signal to a selected stage of the counter means, thereby to indicate an error in the transferred data characters at the completion of the transfer of the group of characters.

References Cited

UNITED STATES PATENTS

| | | | |
|---|---|---|---|
| 2,960,683 | 11/1960 | Gregory et al. ----- | 340—172.5 |
| 3,200,380 | 8/1965 | MacDonald et al. --- | 340—172.5 |
| 3,251,037 | 5/1966 | Coil et al. --------- | 340—172.5 |

FOREIGN PATENTS

| | | |
|---|---|---|
| 929,832 | 6/1963 | Great Britain. |

MALCOLM A. MORRISON, *Primary Examiner.*

MARTIN P. HARTMAN, *Examiner.*